Aug. 25, 1931.   T. F. RATAICZAK   1,820,677
APPARATUS FOR TREATING FOODSTUFFS
Filed Aug. 20, 1926
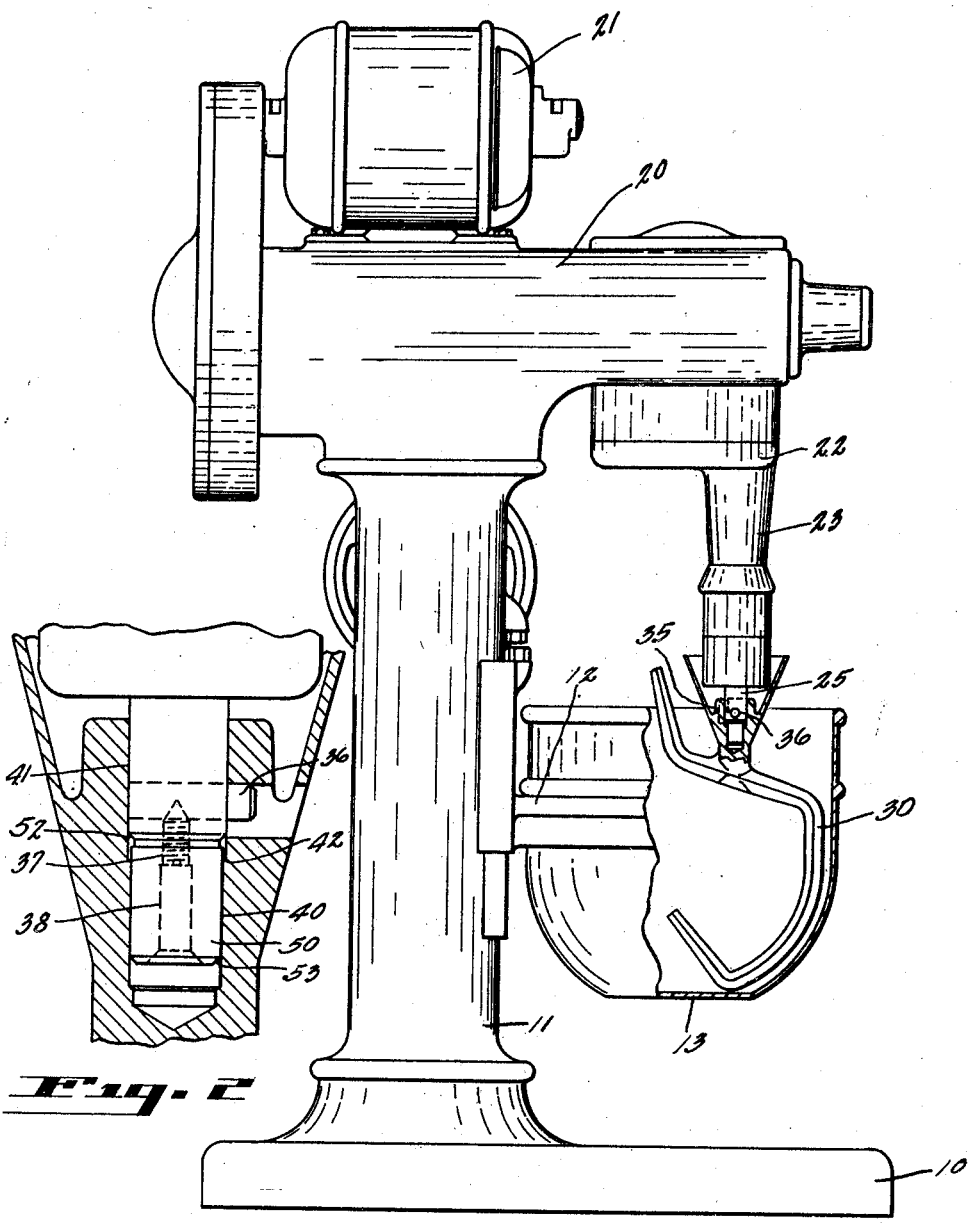

Patented Aug. 25, 1931

1,820,677

UNITED STATES PATENT OFFICE

THOMAS F. RATAICZAK, OF TROY, OHIO, ASSIGNOR TO THE HOBART MANUFACTURING COMPANY, OF TROY, OHIO, A CORPORATION OF OHIO

APPARATUS FOR TREATING FOODSTUFFS

Application filed August 20, 1926. Serial No. 130,475.

This invention relates to mixing machines, and the like, and particularly to machines for mixing foodstuffs which have interchangeable beater or mixer members.

One of the principal objects of this invention is to provide an improved shaft and socket connection for machines of this character, which is simple in construction, and in which the parts may be easily assembled and disassembled.

Other objects and advantages of this invention will be apparent from the following description when taken in connection with the accompanying drawings.

In the drawings in which like characters of reference designate like parts throughout the several views thereof, Fig. 1 is a side elevation of a mixing machine constructed in accordance with this invention, having certain parts broken away and in section to more clearly illustrate the construction thereof; and Fig. 2 is a fragmentary vertical sectional view on an enlarged scale of the shaft and socket connection for attaching the beater to the operating shaft of the mixing machine.

In the embodiment of the invention illustrated herein, a mixing machine is shown comprising a base 10 carrying a standard 11, upon which is mounted a bowl-supporting ring 12 carrying a suitable mixing bowl 13. Positioned at the upper end of the standard 11 is a casing 20, housing suitable gear transmission, driven by a motor 21. Rotatably mounted upon the portion of the casing 20 which overhangs the bowl is a rotary head 22 which is driven by the motor through the gear transmission. Rotatably mounted within a downward extension 23 of the head 22 and also operatively connected to the gear transmission so as to be rotated thereby within the head 22 is a shaft 25 the lower end of which is formed to detachably receive a beater, stirrer or other tool, for operating upon dough, or other material within the bowl. The construction and arrangement of these parts is such that a planetary motion is imparted, the shaft 23 rotating on its own axis, and at the same time moving bodily through a circular path as the head 22 rotates. The driving mechanism and gearing for imparting this motion to the driven shaft 25 from the driving motor 21 is not illustrated, as such mechanism is well known in the art, and any suitable driving connections between the motor 21 and the driven shaft 25 may be used to impart motion thereto.

In the drawings the tool connected to the shaft is shown as a beater or stirrer such as is used for mixing dough for cake or bread making. This beater is indicated generally at 30, and may be of any suitable desired shape other than that shown, so long as it fits within the mixing bowl 13, and upon operation of the shaft 25 serves to rotate and revolve within the mixing bowl to effectively stir up and mix the material contained therein. A machine of this character is adapted for utilizing a considerable number of different types of beaters, mixers, or other food-treating instrumentalities, and the beater which is shown in the drawings is used merely to illustrate the invention. All of these tools are arranged for readily detachable connection to the shaft 25. For effecting this connection the beater is provided with a socket which receives the end of the shaft. This socket is provided with a bayonet groove, indicated in dotted lines by the numeral 35. The shaft in turn is provided with a pin 36, this construction being the usual bayonet connection. The pin 36 is securely held in place by a screw 37 threadedly received within a bore 38 drilled in the end of the shaft 25. In assembling, the beater or the like, is moved to bring the end of the shaft into the socket, with the pin 36 in the axial part of the bayonet groove. The beater is then given a part turn to bring the pin into the circumferential part of the groove.

With a device of this character it is quite desirable that the socket and the shaft be so proportioned as to give a snug fit. In actual practice the socket is given approximately three thousandths (.003) of an inch clearance but with such small clearance the assembling of a beater or like tool in operative position would at times be a difficult matter of manipulation, unless provisions were made for rendering this assembly easier. Particularly in the large view of Fig. 2, the provisions of this invention are clearly shown. As shown the socket in the hub of the beater is of two diameters, the lower part of which is designated generally by the numeral 40 being of substantially less diameter than the upper part which is designated by the numeral 41. In actual practice the upper part has a diameter of approximately one-eighth (⅛th) inch more than the lower part. This diameter difference, although of a substantial value, is relatively small in proportion to the socket bore, which is usually an inch or two in diameter. The shoulder 42 which divides the upper and lower parts of the socket is beveled or inclined.

The end of the shaft 25 is also of two diameters, the extreme end of the shaft which is designated by the numeral 50 being of less diameter than the part of the shaft adjacent the reduced lower end. Also the shoulder which connects the reduced portion of the shaft 50 with the adjacent portion of the shaft is beveled or inclined at substantially the same angle as the shoulder 42 as designated by the numeral 52. The reduced portion of the shaft 50 is made of a diameter which accords with the diameter of the narrower part 40 of the socket, there being as said above, clearance of about three thousandths (.003) inch provided. Also the diameter of the unreduced portion of the shaft 25 which is adapted to cooperate with the upper part 41 of the socket is correspondingly proportioned with respect to this upper part of the socket. The free end of the reduced portion 50 of the shaft is beveled or tapered, as indicated at 53.

The relative sizes of the various parts of the socket and shaft connection are so co-ordinated that an effective piloting and aligning action is obtained during assembly, and the shaft and socket axes are easily aligned. The different cylindrical portions of the shaft and socket are quite long relatively to the comparatively small difference in diameters so that when the smaller diameter shaft portion is inserted in the larger diameter socket portion there is an approximate alignment of the shaft and socket axes. The length of the larger diameter socket portion is nearly the same as that of the smaller diameter shaft portion 50 so that a shaft portion cannot enter a socket portion of corresponding diameter very far before an engagement and centering action obtains along a beveled surface some distance away in an axial direction. Preferably the arrangement of the lengths of the bore and shafts portions is such that one bevel engagement is effective just before the other bevel engagement comes into play and one beveled end or shoulder of a shaft portion thus assists and cooperates with the beveled end or shoulder of the other shaft portion in effectively bringing the shaft and socket into substantially perfect alignment. Thus, without much effort on the part of the operator, the shaft end is accurately piloted and centered so that the assembly of the shaft and socket may be completed and the driving connection with the pin may be easily made. The parts when assembled therefore fit closely and all objectionable relative movement with its resultant noise and wear is prevented.

There is a considerable distance as shown in Fig. 2 between the bottom of socket 40 and the end of the shaft extension 50, as well as between the beveled shoulders 42 and 52 when the parts are in their operative assembled positions thus providing spaces at the ends of the cylindrical portions for any foreign matter. The collection of dough incrustations or the like on articles of this class is to be expected and the spaces mentioned permit any foreign matter on the cylindrical shaft or socket portions to be wiped along the surfaces during the mounting of the beater and remain in these spaces without preventing the shaft from entering the socket to its full extent intended.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In apparatus of the character described, two members to be joined in driving relationship, means for detachably connecting said members in driving relationship, stepped shaft portions on one of said members including outer and inner cylindrical portions of different diameters, the other of said members having stepped socket portions including outer and inner cylindrical socket portions adapted to receive the said stepped cylindrical shaft portions in a close fitting shaft and socket connection, spaced bevels on one of said members, one of said bevels being at the outer end of the stepped portions of the said member and another of said bevels separating stepped portions thereof, the outer cylindrical shaft portion and the outer cylindrical socket portion being of slightly unequal lengths whereby one of said bevels contacts with the other member slightly in advance of the contact of a second bevel with the said other member, the said second bevel contacting before a shaft portion is completely aligned within its cooperating socket portion to provide a successive piloting action of the said bevels on the joining of the said two members.

2. In apparatus of the character described, two members to be joined in driving relationship, means for detachably connecting said members in driving relationship, stepped shaft portions on one of said members including outer and inner cylindrical portions of different diameters, the other of said members having stepped socket portions including outer and inner cylindrical socket portions adapted to receive the said stepped cylindrical shaft portions in a close fitting shaft and socket connection, spaced bevels on one of said members, one of said bevels being at the outer end of the stepped portions of the said member and another of said bevels separating stepped portions thereof, the outer cylindrical shaft portion and the outer cylindrical socket portion being of slightly unequal lengths whereby one of said bevels contacts with the other member slightly in advance of the contact of a second bevel with the said other member, the said second bevel contacting before a shaft portion is completely aligned within its cooperating socket portion to provide a successive piloting action of the said bevels on the joining of the said two members, the said socket portions being formed adjacent the end of each stepped shaft portion when in socketed driving relationship therein to provide material accumulating chambers for the reception of loose material and the prevention of binding upon assembly of the parts.

In testimony whereof I hereto affix my signature.

THOMAS F. RATAICZAK.